US006576586B2

(12) United States Patent
Siqin et al.

(10) Patent No.: US 6,576,586 B2
(45) Date of Patent: Jun. 10, 2003

(54) SELECTIVE HYDROGENATION CATALYST FOR PYROLYSIS GASOLINE

(75) Inventors: Li Siqin, Lanzhou (CN); Men Xiaotang, Lanzhou (CN); Gensheng Liu, Lanzhou (CN); Shunqin Liang, Lanzhou (CN); Xiaogong Zhang, Lanzhou (CN)

(73) Assignee: Petrochina, Beijing (CN)

( * ) Notice: Subject to any disclaimer, the term of this patent is extended or adjusted under 35 U.S.C. 154(b) by 131 days.

(21) Appl. No.: 09/767,238

(22) Filed: Jan. 22, 2001

(65) Prior Publication Data

US 2001/0056036 A1 Dec. 27, 2001

(30) Foreign Application Priority Data

Feb. 3, 2000 (CN) ........................................ 00101797 A

(51) Int. Cl.⁷ ............................ B01J 23/58; B01J 23/40; B01J 23/42; B01J 23/60; B01J 23/72
(52) U.S. Cl. .................. 502/328; 502/327; 502/329; 502/330; 502/331; 502/332; 502/333; 502/339
(58) Field of Search ................ 502/327, 328, 502/330, 331, 332, 333, 339, 355, 439, 415, 306, 313, 314, 317, 318, 320, 322, 323, 341, 346, 329; 501/153

(56) References Cited

U.S. PATENT DOCUMENTS

| 3,615,207 A | * | 10/1971 | Lee ............................. 23/207 |
| 3,635,841 A | * | 1/1972 | Keith et al. ............. 252/466 PT |
| 3,899,444 A | * | 8/1975 | Stephens ................. 252/455 R |
| 4,000,207 A | * | 12/1976 | Kaiser ...................... 260/675.5 |
| 4,119,567 A | * | 10/1978 | Bartsch ....................... 252/430 |
| 4,220,559 A | * | 9/1980 | Polinski .................. 252/455 R |
| 4,237,030 A | * | 12/1980 | Noguchi et al. ............. 252/432 |
| 4,390,456 A | * | 6/1983 | Sanchez et al. ............. 252/448 |
| 4,410,455 A | | 10/1983 | Lambert ..................... 502/327 |
| 4,835,131 A | * | 5/1989 | DeJong ....................... 502/255 |
| 4,919,902 A | * | 4/1990 | Bricker et al. ........... 423/213.5 |
| 5,051,392 A | * | 9/1991 | Mabilon et al. ............. 502/303 |
| 5,707,918 A | * | 1/1998 | Wu et al. .................... 502/230 |
| 5,962,366 A | * | 10/1999 | Zhang ........................ 502/339 |

\* cited by examiner

Primary Examiner—Stanley S. Silverman
Assistant Examiner—Cam N. Nguyen
(74) Attorney, Agent, or Firm—Morrison & Foerster LLP

(57) ABSTRACT

A selective hydrogenation catalyst for pyrolysis gasoline. The catalyst mainly consists of a support of δ, α mixed alumina covered by palladium and alkali metal and/or alkaline-earth metal which are distributed on the support surface, and the support has 0.5 to 09. ml/g of specific pore volume. 40 to 200 Å pores account for more than 85% of the total pore volume. The specific surface area is 70 to 140 $m^2/g$, and α crystal structure in the alumina support is 0.5 to 5% based on the weight percentage of δ, α mixed alumina support. The catalyst includes palladium in amount of 0.05 to 0.4 wt %, alkali metal and/or alkaline-earth metal in amount of 0.05 to 2.0 wt %.

4 Claims, No Drawings

SELECTIVE HYDROGENATION CATALYST FOR PYROLYSIS GASOLINE

This invention involves a selective hydrogenation catalyst for pyrolysis gasoline and the preparation thereof.

THE BACKGROUND OF THE INVENTION

At present, the selective hydrogenation catalyst for industrial pyrolysis gasoline is still taking palladium-based catalyst as the main. There is also the palladium catalyst added with the catalyst promoter. Most of the co-activating component is elements of IA group in the periodical table of elements. For those materials of pyrolysis gasoline with high impurity, the noble metal nickel catalyst has been used for a long time. Because of its slow starting temperature, high hydrogenation activation, large precession material quantity and long lifetime etc, the palladium-based catalyst is obviously superior to catalyst of nickel group, for example, as disclosed in U.S. Pat. No. 4,410,455. But when pyrolysis gasoline contains high diene and the impurities such as arsenic and colloid, many of the industrialized palladium-based catalysts are difficult to operation with stability and for a long time in designed space velocity. It frequently occurs that even though the designed space velocity of catalyst can reach 4.7 $h^{-1}$ during the procedure of fresh feed-in, but it only can operate with a reduced space velocity of 2.8 $h^{-1}$ due to too heavy feed-in and too much impurity.

In order to overcome the deficiency of the prior arts, the object of the present invention is to provide a series of palladium-based hydrogenation catalysts that are adaptive for raw material with high impurity and suitable for operation under high space velocity. Another object of the present invention is to provide a preparation method of a series of palladium-based hydrogenation catalysts.

THE SUMMARY OF THE INVENTION

According to the present invention, a selective hydrogenation catalyst for pyrolysis gasoline is provided, wherein the catalyst mainly consists of a support of $\delta$, $\alpha$ mixed alumina covered by palladium as active component and alkali metal and/or alkaline-earth metal. The palladium is distributed like egg shell on the support surface. And said support has 0.5–0.9 ml/g of specific pore volume, wherein 40–200 Å pores account for more than 85% of the total pore volume, preferably, 100–200 Å pore volume accounts for 65%–80% of the said total pore volume in catalyst support. The specific surface area is about 70–140 $m^2/g$. And $\alpha$ crystal type in the alumina support is about 0.1~5% based on the weight percentage of $\delta$, $\alpha$ mixed alumina support. Said catalyst comprises palladium in amount of 0.05–0.4 wt %, alkali metal and/or alkaline-earth metal in amount of 0.05–2.0 wt %.

The present invention is also related to a selective hydrogenation catalyst for pyrolysis gasoline, wherein the catalyst mainly consists of a support of $\delta$, $\alpha$ mixed alumina covered by palladium as active component, promoter as co-active component and alkali metal and/or alkaline-earth metal. Said palladium is distributed like egg shell on the support surface. Said support has 0.5–0.9 ml/g of specific pore volume, wherein 40–200 Å pores account for more than 85% of the total pore volume, preferably 100–200 Å pore volume accounts for 65%–80% of the said total pore volume in catalyst support. The specific surface area is about 70–140 $m^2/g$, and a crystal type in the alumina support is about 0.1–5% based on the weight percentage of $\delta$, $\alpha$ mixed alumina support, said catalyst containing promoter having selected one from a group of the VIB or IB elements in the periodical table of elements. The ratio of promoter and palladium by weight is about 0.2–2:1. The alkali metal and/or alkaline-earth metal is added in amount of 0.05–2.0 wt %.

According to the invention, the shape of the said catalyst can be either of mechanical punching or of clover or cylinder bar. The shape of support grain does not influence the application of this invention.

The present catalyst is adaptive for hydrogenation of total fraction of pyrolysis "gasoline and $C_6$–$C_8$ intermediate fraction petrol.

The preparation method of catalyst of this invention is used by the method that is known to the person skilled in the arts. In general, that is to say it is the same to the immersion technology for making ordinary lamella catalyst. Therefore, the present invention is to provide a method for preparation of a selective hydrogenation catalyst for pyrolysis gasoline comprising the following steps:

(i) preparing aqueous solution containing palladium and alkali metal and/or alkaline-earth metal in amount of 0.05–2.0 wt %, the pH of said solution being less than 4;

(ii) immersing $\delta$, $\alpha$ mixed $Al_2O_3$ support in said solution at 100–150° C.;

(iii) sintering the immersed support at about 380–500° C. to get a catalyst.

In the method of the invention, a promoter is applied to form immersion solution. Said promoter is selected from a group of the VIB or IB elements in the periodical table of elements.

In addition, ratio of promoter and palladium by weight in the present method is defined to 0.2–2:1.

In another words, Firstly, solution which can be mutual-soluble with the immersion liquid (for example the deionized water) is used to immerse the pre-immersed support, then the pre-immersed $\delta$, $\alpha$ mixed alumina support is immersed with salt solution having active component such as palladium. After washing, drying and sintering, the immersed support will become a final product of oxide-type catalyst. The catalyst product can be used after the deoxidization by putting in hydrogen in reactor.

The promoter in the invention can form a complex with palladium. The formation of such a complex is beneficial to the even distribution of palladium grains, and to improve and increase the utilization factor of palladium, and to reduce the loss of palladium and extend the lifetime of catalyst. The alkali metals can change the acid-base status of support surface, which is beneficial to reduce sedimentation of colloid and carbon in hydrogenation period. The pores are evenly distributed, which has the function of reducing the inner diffusion resistance. The larger specific pore volume is beneficial to the material with a bigger procession quantity and higher impurity contents. In combination of the above-mentioned factors, the catalyst of this invention is especially adaptive for the procession of material with high impurity contents as well as for the hydrogenation under higher space velocity. For example, the procession of total fraction pyrolysis gasoline of colloid will be <60 mg/100 ml, diene value <40 g iodin/100 g petrol, especially under the space velocity of 4.0–6.0 $h^{-1}$ (fresh oil), it can carry out the hydrogenation to the $C_6$–$C_8$ medium petrol.

The catalyst can be prepared classically by the shell layer immersion technology as known by the skilled in the arts. During the preparation, the elements as promoter selected from a group of the VIB, IB, IA and IIA in the Periodical Table of Elements are applied. Their oxides, hydroxides and organic and inorganic salts of the promoter elements are preferable to be used in the present invention. These substances are added to fully dissolve to make immersion solution. In addition, said support may be pre-immersed with solution that can mix with immersion solution each other.

The advantages of this invention are that the large quantity of materials can be treated (for $C_6$–$C_8$ medium fraction petrol, the space velocity can reach 4.0–6.0h$^{-1}$ when the fresh petrol is calculated); for the treatment of material with high impurities, the hydrogenation activity is high with good selectivity. The chemical stability and the thermal stability are much better during the long period operation. The sol performance is good and the carbon quantity is low. The catalyst has long lifetime and the preparation thereof is simple.

The foregoing and other advantages of the invention will appear from the following description. These embodiments do not represent the full scope of the invention. Thus, the claim should be looked to in order to judge the scope of the invention.

DETAILED DESCRIPTION OF THE PREFERRED EMBODIMENTS

EXAMPLE 1

0.2 ml of $Cu(CH_3COO)_2$ solution (0.03 gCu/ml) was mixed with 0.1 ml of $Mg(NO_3)_2$ solution (0.12 g Mg/ml) and 0.6 ml of $H_2PdCl_4$ solution (0.1 g Pd/ml) to obtain 20 ml of immersion solution with pH value of less than 4. 20 g of δ, a mixed $Al_2O_3$ support was pre-immersed with the deionized water. Then the support was immersed in 20 ml of said immersion solution for about 30 minutes at 100° C. The treated support was filtered and separated and washed by distilled water until no Cl$^-$ ion was detected in wash water. The pH of remaining solution will not be equal to 4.0. The immersed support was dried in about 150° C. and sintered at 380° C. to get a oxidized catalyst of this invention. The external appearance of catalyst is filbert and likes a clover bar in light brown color. Its specification can be φ2.8–3.2× 3–10 mm. The physical features of catalyst are shown in table 1.

EXAMPLE 2

The same procedure was repeated with Example 1 except that 0.1 ml of $AgNO_3$ solution (0.005 g Ag/ml) was mixed with 0.2 ml of $Na_2CO_3$ solution) (0.17 g Na/ml) and 0.8 ml of $H_2PdCl_4$ solution (0.1 g Pd/ml) to obtain activated, immersion solution. After pre-immersed with the distilled water, 209 of δ, a mixed $Al_2O_3$ support was immersed with said immersion solution. The immersed support was dried in about 120° C. and sintered at 400° C. to get a catalyst with physical features indicated in Table 1.

EXAMPLE 3

The same procedure was repeated with Example 1 except that 0.3 g of $MoO_3$ and 0.33 g of $K_2CO_3$ were mixed with distilled water to be fully dissolved. 0.1 ml of $Ba(NO_3)_2$ (0.28 g Ba/ml) solution was mixed with 0.5 ml of $H_2PdCl_4$ solution (0.1 g Pd/ml) to obtain activated immersion solution. After pre-immersed with the distilled water, 20 g of δ, a mixed $Al_2O_3$ support was immersed with said immersion solution. The immersed support was dried in about 100° C. and sintered at 400° C. to get a catalyst with physical features indicated in Table 1.

EXAMPLE 4

The same procedure was repeated with Example 1 except that 0.95 ml of $Cu(CH_3COO)_2$ solution (0.03 g Cu/ml) was mixed with 0.4 ml of $LiNO_3$ solution (0.46 g Li/ml) and 0.6 ml of $H_2PdCl_4$ solution (0.1 g Pd/ml) to obtain activated immersion solution. After pre-immersed with the distilled water, 20 g of δ, a mixed $Al_2O_3$ support was immersed with said immersion solution. The immersed support was dried in about 100° C. and sintered at 400° C. to get a catalyst with physical features indicated in Table 1.

EXAMPLE 5

The same procedure was repeated with Example 1 except that 0.8 ml of $Cr(NO_3)_3$ solution (0.5 g Cr/ml) was mixed with 0.58 g $Ca(OH)_2$ to have a mixture. 0.56 ml of $H_2PdCl_4$ solution (0.1 g Pd/ml) was added to the mixture to obtain activated immersion solution. After pre-immersed with the distilled water, 20 g of δ, a mixed $Al_2O_3$ support was immersed with said immersion solution. The immersed support was dried in about 110° C. and sintered at 500° C. to get a catalyst with physical features indicated in Table 1. support was immersed in 20 ml of said immersion solution for about 30 minutes at 100° C. The treated support was filtered and separated and washed by distilled water until no Cl$^-$ ion was detected in wash water. The pH of remaining solution will not be equal to 4.0. The immersed support was dried in about 150° C. and sintered at 380° C. to get a oxidized catalyst of this invention. The external appearance of catalyst is filbert and likes a clover bar in light brown color. Its specification can be φ2.8–3.2×3–10 mm. The physical features of catalyst are shown in table 1.

EXAMPLE 2

The same procedure was repeated with Example 1 except that 0.1 ml of $AgNO_3$ solution (0.005 g Ag/ml) was mixed with 0.2 ml of $Na_2CO_3$ solution (0.17 g Na/ml) and 0.8 ml of $H_2PdCl_4$ solution (0.1 g Pd/ml) to obtain activated immersion solution. After pre-immersed with the distilled water, 20 g of δ, α mixed $Al_2O_3$ support was immersed with said immersion solution. The immersed support was dried in about 120° C. and sintered at 400° C. to get a catalyst with physical features indicated in Table 1.

EXAMPLE 3

The same procedure was repeated with Example 1 except that 0.3 g of $MoO_3$ and 0.33 g $K_2CO_3$ were mixed with distilled water to be fully dissolved. 0.1 ml Of $Ba(NO_3)_2$ (0.28 g Ba/ml) solution was mixed with 0.5 ml of $H_2PdCl_4$ solution (0.1 g Pd/ml) to obtain activated immersion solution. After pre-immersed with the distilled water, 20 g of δ, α mixed $Al_2O_3$ support was immersed with said immersion solution. The immersed support was dried in about 100° C. and sintered at 400° C. to get a catalyst with physical features indicated in Table 1.

EXAMPLE 4

The same procedure was repeated with Example 1 except that 0.95 ml of $Cu(CH_3COO)_2$ solution (0.03 gCu/ml) was mixed with 0.4 ml of $LiNO_3$ solution (0.46 g Li/ml) and 0.6 ml of $H_2PdCl_4$ solution (0.1 g Pd/ml) to obtain activated immersion solution. After pre-immersed with the distilled water, 20 g of δ, α mixed $Al_2O_3$ support was immersed with said immersion solution. The immersed support was dried in about 100° C. and sintered at 400° C. to get a catalyst with physical features indicated in Table 1.

EXAMPLE 5

The same procedure was repeated with Example 1 except that 0.8 ml of $Cr(NO_3)_3$ solution (0.5 gCr/ml) was mixed with 0.58 g $Ca(OH)_2$ to have a mixture. 0.56 ml of $H_2PdCl_4$ solution (0.1 g Pd/ml) was added to the mixture to obtain activated immersion solution. After pre-immersed with the distilled water, 20 g of δ, α mixed $Al_2O_3$ support was immersed with said immersion solution. The immersed support was dried in about 110° C. and sintered at 500° C. to get a catalyst with physical features indicated in Table 1.

EXAMPLE 6

The same procedure was repeated with Example 1 except that 0.4 ml of $LiOOCCH_3$ solution (0.46 g Li/ml) was mixed with 0.56 ml of $H_2PdCl_4$ solution (0.1 g Pd/ml) to obtain activated immersion solution. After pre-immersed with the distilled water, 20 g of δ, a mixed $Al_2O_3$ support was immersed with said immersion solution. The immersed support was dried in about 110° C. and sintered at 420° C. to get a catalyst with physical features indicated in Table 1.

Comparative Example

A single-metal Pd catalyst was prepared in accordance with the common method for making a Pd catalyst. The external appearance of catalyst is filbert with cylinder shape and in light brown color. Its specification is φ4×4 mm. The physical features of catalyst is shown in table 1.

TABLE 1

Physical features obtained in the examples and comparison one

| | Examples | | | | | | Comparative |
|---|---|---|---|---|---|---|---|
| Item | 1 | 2 | 3 | 4 | 5 | 6 | example |
| Support | | | | | | | |
| Specific surface area m²/g | 81 | 95 | 102 | 110 | 125 | 109 | 102 |
| Specific pore volume ml/g | 0.62 | 0.65 | 0.73 | 0.73 | 0.78 | 0.69 | 0.51 |
| Pore distribution: % | | | | | | | |
| 40–200°A | 88 | 86 | 95 | 91 | 90 | 89 | 72 |
| 100–200°A | 72 | 69 | 75 | 70 | 67 | 71 | 9 |
| Proportion of α crystal type | 0.8 | 0.7 | 1.0 | 1.9 | 2.5 | 1.3 | 6.0 |
| Pile intensity g/ml | 0.57 | 0.59 | 0.60 | 0.64 | 0.58 | 0.61 | 0.79 |
| Catalyst | | | | | | | |
| Pd composition wt % | 0.30 | 0.40 | 0.25 | 0.30 | 0.28 | 0.28 | 0.30 |
| Co-active component wt % | Cu 0.03 | Ag 0.025 | Mo 1.0 | Cu 1.4 | Cr 2.0 | — | — |
| Alkali metal component wt % | — | Na 0.17 | K 0.47 | Li 0.92 | — | Li 0.92 | — |
| Alkaline-earth metal component wt % | Mg 0.06 | — | Ba 0.14 | — | Ca 1.56 | — | — |

The 1000-hours activity evaluation was carried out on 300 ml heat-insulating or adiabatic bed for the Examples 1, 2, 3, 4, 5 and Comparative Example 6. The evaluation results were shown in table 2.

TABLE 2

Hydrogenation performances of catalyst obtained in the examples and comparative one*

| | examples | | | | | | Comparative |
|---|---|---|---|---|---|---|---|
| Item | 1 | 2 | 3 | 4 | 5 | 6 | example |
| Operation Conditions | | | | | | | |
| Temperature C.° | 45 | 45 | 45 | 45 | 45 | 45 | 50 |
| Space Velocity with fresh petrol ($h^{-1}$) | 5.0 | 4.5 | 5.5 | 5.5 | 6.0 | 5.0 | 4.0 |
| Pressure MPa | 2.8 | 2.8 | 2.8 | 2.8 | 2.8 | 2.8 | 2.8 |
| Ratio of hydrogen and petrol v/v | 50:1 | 50:1 | 50:1 | 50:1 | 50:1 | 50:1 | 50:1 |
| Diene ratio of product after hygrogenation* g I/100 g oil iodin/100 g | | | | | | | |
| 200 hours | 0.82 | 0.79 | 0.44 | 0.58 | 0.73 | 1.06 | 2.23 |
| 500 hours | 0.94 | 0.98 | 0.91 | 0.97 | 1.06 | 1.77 | 2.65 |
| 750 hours | 1.06 | 1.02 | 1.02 | 1.08 | 1.29 | 1.98 | 2.94 |
| 1000 hours | 1.32 | 1.08 | 1.18 | 1.22 | 1.68 | 2.05 | 3.02 |
| Amount of Sol | 7.8 | 6.9 | 6.5 | 7.0 | 8.7 | 6.7 | 10.6 |

*In the evaluation, the diene value of petrol used is 30–40 g iodin/100 g petrol, the colloid < 60 mg/100 ml. The material petrol used before 750 hours is $C_6$–$C_8$ medium fraction of pyrolysis gasoline. In 750–1000 hours, it will be changed to all fraction material petrol of pyrolysis gasoline.
*The measurement method for diene value in the petrol is malic acid anhydride method.

Table 3 is the comparison and evaluation result of hydrogenation performances of catalysts in Example 4 and comparative example on the 300 ml heat-insulating bed and under the high space velocity. The material used in the evaluation is the $C_6$–$C_8$ medium fraction of pyrolysis gasoline in the evaluation. Its diene is 30–40 g iodin/100 g petrol and the colloid is less than 60 mg/100 ml.

TABLE 3

Comparison of hydrogenation performances of catalyst in the comparative example in the high space velocity

| Item | Application example 4 | Comparison example |
|---|---|---|
| Temperature ° C. | 50 | 50 |
| Pressure MPa | 2.8 | 2.8 |
| Operation | | |
| Hydrogen-petrol ratio | 50:1 | 50:1 |
| Space velocity $H^{-1}$ with fresh petrol | 6.0 | 6.0 |
| Cyclic ratio | 3:1 | 3:1 |
| Total space velocity $h^{-1}$ | 24 | 24 |
| The diene value of product after hydrogenation gl/100 g oil | | |
| 150 hours | 0.61 | 3.28 |
| 300 hours | 0.88 | 5.79 |
| 500 hours | 1.05 | 6.32 |
| Amount of Sol % | 6.4 | 9.3 |

We claim:
1. A selective hydrogenation catalyst for pyrolysis gasoline, wherein the catalyst mainly consists of a support of

δ, α mixed alumina covered by palladium and alkali metal and/or alkaline-earth metal which are distributed on the support surface, the support having 0.5 to 0.9 ml/g of specific pore volume, wherein 40 to 200 Å pores account for more than 85% of the total pore volume, the specific surface area is 70 to 140 m$^2$/g, and α crystal structure in the alumina support is 0.1 to 5% based on the weight percentage of δ, α mixed alumina support, the catalyst comprising palladium in amount of 0.05 to 0.4 wt %, alkali metal and/or alkaline-earth metal in amount of 0.05 to 2.0 wt %.

2. A selective hydrogenation catalyst for pyrolysis gasoline, wherein the catalyst mainly consists of a support of δ, α mixed alumina covered by palladium and alkali metal and/or alkaline-earth metal which are distributed on the support surface, the support having 0.5 to 0.9 ml/g of specific pore volume, wherein 100 to 200 Å pores account for 65% to 85% of the total pore volume, the specific surface area is 70 to 140 m$^2$/g, and α crystal structure in the alumina support is 0.1 to 5% based on the weight percentage of δ, α mixed alumina support, the catalyst comprising palladium in amount of 0.05 to 0.4 wt %, alkali metal and/or alkaline-earth metal in amount of 0.05 to 2.0 wt %.

3. A selective hydrogenation catalyst for pyrolysis gasoline, wherein the catalyst mainly consists of a support of δ, α mixed alumina covered by palladium, promoter, and alkali metal and/or alkaline-earth metal distributed on the support surface, the support having 0.5 to 0.9 ml/g of specific pore volume, wherein 40 to 200 Å pores account for more than 85% of the total pore volume, the specific surface area is 70 to 140 m$^2$/g, and α crystal structure in the alumina support is 0.1 to 5%, based on the weight percentage of δ, α mixed alumina support, the promoter is selected from a group consisting of the VIB and IB elements in the periodic table of elements, the ratio of promoter and palladium by weight is 0.2 to 2:1, the alkali metal and/or alkaline-earth metal is added in amount of 0.05 to 2.0 wt %.

4. A selective hydrogenation catalyst for pyrolysis gasoline, wherein the catalyst mainly consists of a support of δ, α mixed alumina covered by palladium, promoter, and alkali metal and/or alkaline-earth metal distributed on the support surface, the support having 0.5 to 0.9 ml/g of specific pore volume, wherein 100 to 200 Å pores account for 65% to 85% of the total pore volume, the specific surface area is 70 to 140 m$^2$/g, and α crystal structure in the alumina support is 0.1 to 5%, based on the weight percentage of δ, α mixed alumina support, the promoter is selected from a group consisting of the VIB and IB elements in the periodic table of elements, the ratio of promoter and palladium by weight is 0.2 to 2:1, the alkali metal and/or alkaline-earth metal is added in amount of 0.05 to 2.0 wt %.

* * * * *

UNITED STATES PATENT AND TRADEMARK OFFICE
CERTIFICATE OF CORRECTION

PATENT NO. : 6,576,586 B2
DATED : June 10, 2003
INVENTOR(S) : Siqin Li et al.

It is certified that error appears in the above-identified patent and that said Letters Patent is hereby corrected as shown below:

Title page,
Item [12], United States Patent, change "Siqin et al." to -- Li et al. --.
Item [75], Inventors, change "Li Siqin" to -- Siqin Li --; and change "Men Xiaotang" to -- Xiaotang Men --,
Item [73], Assignee, after "Petrochina" add -- Company Limited --.

Signed and Sealed this

Thirtieth Day of December, 2003

JAMES E. ROGAN
*Director of the United States Patent and Trademark Office*